US012395229B2

United States Patent
Yu et al.

(10) Patent No.: US 12,395,229 B2
(45) Date of Patent: Aug. 19, 2025

(54) FAILURE RECOVERY OF SIDELINK WITH BEAMFORMING

(71) Applicant: Nokia Technologies Oy, Espoo (FI)

(72) Inventors: Ling Yu, Kauniainen (FI); Vinh Van Phan, Oulu (FI); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 494 days.

(21) Appl. No.: 17/295,614

(22) PCT Filed: Nov. 26, 2019

(86) PCT No.: PCT/IB2019/060184
§ 371 (c)(1),
(2) Date: May 20, 2021

(87) PCT Pub. No.: WO2020/109997
PCT Pub. Date: Jun. 4, 2020

(65) Prior Publication Data
US 2022/0029691 A1 Jan. 27, 2022

Related U.S. Application Data (60) Provisional application No. 62/773,797, filed on Nov. 30, 2018.

(51) Int. Cl.
*H04B 7/08* (2006.01)
*H04W 76/19* (2018.01)
*H04W 92/18* (2009.01)

(52) U.S. Cl.
CPC ............ *H04B 7/088* (2013.01); *H04W 76/19* (2018.02); *H04W 92/18* (2013.01)

(58) Field of Classification Search
CPC ...... H04B 7/088; H04W 76/19; H04W 92/18; H04W 88/08
See application file for complete search history.

(56) References Cited

U.S. PATENT DOCUMENTS 11,647,493 B2 * 5/2023 Zhou .................. H04W 72/046
370/225
2015/0118954 A1 4/2015 Sundstedt et al.
(Continued)

FOREIGN PATENT DOCUMENTS

CN 104469827 A 3/2015
CN 104823511 A 8/2015
(Continued)

OTHER PUBLICATIONS

"New SID: Study on NR V2X", 3GPP TSG RAN Meeting #80, RP-181480, Agenda : 9.1.5, Vodafone, Jun. 11-14, 2018, 5 pages.
(Continued)

*Primary Examiner* — Chuong M Nguyen
(74) *Attorney, Agent, or Firm* — Lippes Mathias LLP (57) ABSTRACT

According to a first embodiment, a method may include transmitting, by a first user equipment, at least one sidelink failure indication using at least one sidelink failure recovery-specific configuration. The method may further include receiving, by the first user equipment, at least one sidelink failure response. The method may further include determining, by the first user equipment, at least one source-specific sidelink recovery mode associated with the at least one sidelink failure recovery-specific configuration.

8 Claims, 5 Drawing Sheets

(56) References Cited

U.S. PATENT DOCUMENTS

| | | | | |
|---|---|---|---|---|
| 2015/0133132 | A1* | 5/2015 | Li | H04W 52/246 |
| | | | | 455/450 |
| 2015/0365994 | A1 | 12/2015 | Yu et al. | |
| 2016/0234702 | A1* | 8/2016 | Heo | H04W 88/08 |
| 2016/0270088 | A1* | 9/2016 | Martin | H04W 74/0808 |
| 2017/0041818 | A1 | 2/2017 | Lee et al. | |
| 2017/0079016 | A1* | 3/2017 | Nord | H04W 48/02 |
| 2018/0242128 | A1* | 8/2018 | Kashiwase | H04W 4/46 |
| 2018/0302889 | A1* | 10/2018 | Guo | H04B 17/309 |
| 2018/0309496 | A1* | 10/2018 | Lee | H04L 5/0053 |
| 2019/0045345 | A1* | 2/2019 | Lee | H04L 1/1812 |
| 2019/0110281 | A1* | 4/2019 | Zhou | H04W 76/19 |
| 2019/0394786 | A1* | 12/2019 | Parron | H04W 4/46 |
| 2021/0211348 | A1* | 7/2021 | Li | H04W 76/19 |
| 2022/0007403 | A1* | 1/2022 | Li | H04W 72/20 |
| 2022/0039080 | A1* | 2/2022 | Khoryaev | H04W 4/025 |

FOREIGN PATENT DOCUMENTS

| | | |
|---|---|---|
| CN | 108023814 A | 5/2016 |
| CN | 105934985 A | 9/2016 |
| CN | 107612613 A | 1/2018 |
| CN | 108605253 A | 9/2018 |
| WO | 2016/119287 A1 | 8/2016 |
| WO | 2017/119919 A1 | 7/2017 |
| WO | 2018/129300 A1 | 7/2018 |

OTHER PUBLICATIONS

"LS on Support of Unicast, Groupcast, and Broadcast", 3GPP TSG RAN WG1 Meeting #94, R1-1809907, RAN WG1, Aug. 20-24, 2018, 1 page.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.

"3rd Generation Partnership Project; Technical Specification Group Radio Access Network; NR; NR and NG-RAN Overall Description; Stage 2 (Release 15)", 3GPP TS 38.300, V15.3.1, Oct. 2018, pp. 1-92.

"Discussion on Beam Management for NR-V2X Sidelink in Millimeter-wave Bands", 3GPP TSG RAN WG1 Meeting #94, R1-1809039, Agenda : 7.2.4.1.2, Toyota InfoTechnology Center, Aug. 20-24, 2018, 7 pages.

International Search Report and Written Opinion received for corresponding Patent Cooperation Treaty Application No. PCT/IB2019/060184, dated Jan. 29, 2020, 12 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.3.0, Sep. 2018, pp. 1-918.

"Considerations on Beam-based Transmission for Sidelink", 3GPP TSG RAN WG1 Meeting #94bis, R1-1811003, Agenda : 7.2.4.1.5, Spreadtrum Communications, Oct. 8-12, 2018, 2 pages.

"Sidelink Unicast in NR", 3GPP TSG-RAN WG2 Meeting #103 bis, R2-1813921, Agenda : 11.4.2.3, vivo, Oct. 8-12, 2018, 4 pages.

Office Action received for corresponding Chinese Patent Application No. 201980087241.5, dated Dec. 15, 2023, 9 pages of Office Action and no page of translation available.

"Discussion on L2 protocol design for NR sidelink", 3GPP TSG-RAN WG2 # 103bis, R2-1814245, Agenda Item: 11.4.2.2, Huawei, Oct. 8-12, 2018, 5 pages.

Office action received for corresponding European Patent Application No. 19816897.3, dated Feb. 6, 2024, 7 pages.

Notice of Allowance received for corresponding Chinese Patent Application No. 201980087241.5, dated Jun. 5, 2024, 5 pages of office action and no page of translation available.

Office action received for corresponding European Patent Application No. 19816897.3, dated Nov. 15, 2024, 7 pages.

\* cited by examiner

FAILURE RECOVERY OF SIDELINK WITH BEAMFORMING

RELATED APPLICATION

This application claims priority to PCT Application No. PCT/IB2019/060184, filed on Nov. 26, 2019, which claims priority to U.S. Application No. 62/773,797, filed on Nov. 30, 2018, each of which is incorporated herein by reference in its entirety.

BACKGROUND

Field

Certain embodiments may relate to wireless communication systems. For example, some embodiments may relate to sidelink failure recovery.

Description of the Related Art

In order to support applications such as vehicle platooning, extended sensor, and/or other advanced driving capabilities, 3rd Generation Partnership Project (3GPP) may support various sidelink frequency ranges (FR), including FR1 and FR2. Such applications may require high data rates, for example, sharing video streams between moving vehicles. The mmWave band in FR2 offers wide bandwidth for high data rate transmissions, and is considered a candidate frequency band for sidelink operations, particularly for those operations requiring high data rates. However, the mmWave band is associated with high path loss and short communication range. In order to compensate for this high path loss, beamforming techniques with narrow beams or a directional antenna may improve communication ranges between transmitters (Tx) and receivers (Rx). Even with this modification, tracking and aligning the beams of the moving Tx and Rx is difficult with rapid vehicle movement.

Another challenge with the mmWave frequency band is high penetration loss, making the communication link between two vehicles easily blocked by objects such as buildings and other vehicles. Thus, an established sidelink between vehicles may suffer radio link failure due to either a misalignment of the beams and/or an obstacle existing between the Tx and Rx, resulting in a sudden change of channel condition from line-of-sight (LOS) to no-line-of-sight (NLOS).

SUMMARY

In accordance with some embodiments, a method may include transmitting, by a first user equipment, at least one sidelink failure indication using at least one sidelink failure recovery-specific configuration. The method may further include receiving, by the first user equipment, at least one sidelink failure response. The method may further include determining, by the first user equipment, at least one source-specific sidelink recovery mode associated with the at least one sidelink failure recovery-specific configuration.

In accordance with some embodiments, an apparatus may include means for transmitting at least one sidelink failure indication using at least one sidelink failure recovery-specific configuration. The apparatus may further include means for receiving at least one sidelink failure response. The apparatus may further include means for determining at least one source-specific sidelink recovery mode associated with the at least one sidelink failure recovery-specific configuration.

In accordance with some embodiments, an apparatus may include at least one processor and at least one memory including computer program code. The at least one memory and the computer program code may be configured to, with the at least one processor, cause the apparatus to at least transmit at least one sidelink failure indication using at least one sidelink failure recovery-specific configuration. The at least one memory and the computer program code may be further configured to, with the at least one processor, cause the apparatus to at least receive at least one sidelink failure response. The at least one memory and the computer program code may be further configured to, with the at least one processor, cause the apparatus to at least determine at least one source-specific sidelink recovery mode associated with the at least one sidelink failure recovery-specific configuration.

In accordance with some embodiments, a non-transitory computer readable medium may comprise program instructions for causing an apparatus to perform a method. The method may transmit at least one sidelink failure indication using at least one sidelink failure recovery-specific configuration. The method may further receive at least one sidelink failure response. The method may further determine at least one source-specific sidelink recovery mode associated with the at least one sidelink failure recovery-specific configuration.

In accordance with some embodiments, a computer program product may perform a method. The method may transmit at least one sidelink failure indication using at least one sidelink failure recovery-specific configuration. The method may further receive at least one sidelink failure response. The method may further determine at least one source-specific sidelink recovery mode associated with the at least one sidelink failure recovery-specific configuration.

In accordance with some embodiments, an apparatus may include circuitry configured to transmit at least one sidelink failure indication using at least one sidelink failure recovery-specific configuration. The circuitry may further receive at least one sidelink failure response. The circuitry may further determine at least one source-specific sidelink recovery mode associated with the at least one sidelink failure recovery-specific configuration.

In accordance with some embodiments, a method may include receiving, by a first user equipment, at least one sidelink failure indication from a second user equipment. The method may further include identifying, by the first user equipment, at least one sidelink failure recovery-specific configuration associated with the received at least one sidelink failure indication. The method may further include transmitting, by the first user equipment, at least one sidelink failure response to the second user equipment using the identified at least one sidelink failure recovery-specific configuration. The method may further include determining, by the first user equipment, at least one source-specific sidelink recovery mode associated with the at least one sidelink failure recovery-specific configuration.

In accordance with some embodiments, an apparatus may include means for receiving at least one sidelink failure indication from a user equipment. The apparatus may further include means for identifying at least one sidelink failure recovery-specific configuration associated with the received at least one sidelink failure indication. The apparatus may further include means for transmitting at least one sidelink failure response to the user equipment using the identified at least one sidelink failure recovery-specific configuration. The apparatus may further include means for determining at least one source-specific sidelink recovery mode associated with the at least one sidelink failure recovery-specific configuration.

In accordance with some embodiments, an apparatus may include at least one processor and at least one memory including computer program code. The at least one memory and the computer program code may be configured to, with the at least one processor, cause the apparatus to at least receive at least one sidelink failure indication from a user equipment. The at least one memory and the computer program code may be further configured to, with the at least one processor, cause the apparatus to at least identify at least one sidelink failure recovery-specific configuration associated with the received at least one sidelink failure indication. The at least one memory and the computer program code may be further configured to, with the at least one processor, cause the apparatus to at least transmit at least one sidelink failure response to the user equipment using the identified at least one sidelink failure recovery-specific configuration. The at least one memory and the computer program code may be further configured to, with the at least one processor, cause the apparatus to at least determine at least one source-specific sidelink recovery mode associated with the at least one sidelink failure recovery-specific configuration.

In accordance with some embodiments, a non-transitory computer readable medium may comprise program instructions for causing an apparatus to perform a method. The method may receive at least one sidelink failure indication from a user equipment. The method may further identify at least one sidelink failure recovery-specific configuration associated with the received at least one sidelink failure indication. The method may further transmit at least one sidelink failure response to the user equipment using the identified at least one sidelink failure recovery-specific configuration. The method may further determine at least one source-specific sidelink recovery mode associated with the at least one sidelink failure recovery-specific configuration.

In accordance with some embodiments, a computer program product may perform a method. The method may receive at least one sidelink failure indication from a user equipment. The method may further identify at least one sidelink failure recovery-specific configuration associated with the received at least one sidelink failure indication. The method may further transmit at least one sidelink failure response to the user equipment using the identified at least one sidelink failure recovery-specific configuration. The method may further determine at least one source-specific sidelink recovery mode associated with the at least one sidelink failure recovery-specific configuration.

In accordance with some embodiments, an apparatus may include circuitry configured to receive at least one sidelink failure indication from a user equipment. The circuitry may further identify at least one sidelink failure recovery-specific configuration associated with the received at least one sidelink failure indication. The circuitry may further transmit at least one sidelink failure response to the user equipment using the identified at least one sidelink failure recovery-specific configuration. The circuitry may further determine at least one source-specific sidelink recovery mode associated with the at least one sidelink failure recovery-specific configuration.

In accordance with some embodiments, a method may include receiving, by a network entity, at least one sidelink failure indication using at least one sidelink failure recovery-specific configuration. The method may further include identifying, by the network entity, the source from which the at least one sidelink failure indication was received as a first user equipment. The method may further include transmitting, by the network entity, at least one sidelink failure response to the first user equipment and/or a second user equipment. The method may further include relaying, by the network entity, at least one sidelink communication between the first user equipment and the second user equipment.

In accordance with some embodiments, an apparatus may include means for receiving at least one sidelink failure indication using at least one sidelink failure recovery-specific configuration. The apparatus may further include means for identifying the source from which the at least one sidelink failure indication was received as a first user equipment. The apparatus may further include means for transmitting at least one sidelink failure response to the first user equipment and/or a second user equipment. The apparatus may further include means for relaying at least one sidelink communication between the first user equipment and the second user equipment.

In accordance with some embodiments, an apparatus may include at least one processor and at least one memory including computer program code. The at least one memory and the computer program code may be configured to, with the at least one processor, cause the apparatus to at least receive at least one sidelink failure indication using at least one sidelink failure recovery-specific configuration. The at least one memory and the computer program code may be further configured to, with the at least one processor, cause the apparatus to at least identify the source from which the at least one sidelink failure indication was received as a first user equipment. The at least one memory and the computer program code may be further configured to, with the at least one processor, cause the apparatus to at least transmit at least one sidelink failure response to the first user equipment and/or a second user equipment. The at least one memory and the computer program code may be further configured to, with the at least one processor, cause the apparatus to at least relay at least one sidelink communication between the first user equipment and the second user equipment.

In accordance with some embodiments, a non-transitory computer readable medium may comprise program instructions for causing an apparatus to perform a method. The method may receive at least one sidelink failure indication using at least one sidelink failure recovery-specific configuration. The method may further identify the source from which the at least one sidelink failure indication was received as a first user equipment. The method may further transmit at least one sidelink failure response to the first user equipment and/or a second user equipment. The method may further relay at least one sidelink communication between the first user equipment and the second user equipment.

In accordance with some embodiments, a computer program product may perform a method. The method may receive at least one sidelink failure indication using at least one sidelink failure recovery-specific configuration. The method may further identify the source from which the at least one sidelink failure indication was received as a first user equipment. The method may further transmit at least one sidelink failure response to the first user equipment and/or a second user equipment. The method may further relay at least one sidelink communication between the first user equipment and the second user equipment.

In accordance with some embodiments, an apparatus may include circuitry configured to receive at least one sidelink failure indication using at least one sidelink failure recovery-specific configuration. The circuitry may further identify the source from which the at least one sidelink failure indication was received as a first user equipment. The circuitry may further transmit at least one sidelink failure response to the first user equipment and/or a second user equipment. The circuitry may further relay at least one sidelink communication between the first user equipment and the second user equipment.

BRIEF DESCRIPTION OF THE DRAWINGS

For proper understanding of this disclosure, reference should be made to the accompanying drawings, wherein.

DETAILED DESCRIPTION

As discussed in 3GPP TS 36.300 and TS 38.300, the radio link failure recovery process in long-term evolution (LTE) or new radio (NR) technology over a Uu interface may be performed via the re-establishment of a radio resource control (RRC) connection to a suitable cell, re-establishing the radio link between a user equipment and base station using the existing user equipment context, if available. However, radio link failure recovery schemes specified for Uu interfaces may not be applied to solve the problems of radio link failure caused by the misalignment of the transmission and receiving beams and/or a signal impediment existing between transmitting and receiving user equipment.

An initial beam alignment, beam tracking, and/or beam recovery may facilitate beam operations by utilizing side information such as basic safety messages (BSMs), which could include position, speed, acceleration, heading, and predicted path. A higher layer based on the side information may be able to detect a potential blockage that is causing link failure, and then trigger the beam recovery procedure. However, such techniques require significant cross-layer interaction such that the application layer should provide information to lower layers in an access stratum for beam management-related configuration.

Certain embodiments discussed herein are directed towards an adaptive sidelink failure recovery mechanism based on failure indication and responses from different entities. For example, a first user equipment and a second user equipment, such as two vehicles, may have established a unicast sidelink connection using beamforming. Beam tracking mechanisms may maintain the proper beams between the user equipment for sidelink communication. However, beam tracking procedures may not always ensure the alignment of the beams between the user equipment, such as in a high mobility scenario. Thus, sidelink failure may occur due to either misalignment of the transmitter and/or receiver beams, and/or an obstacle blocking the LOS between the user equipment.

Even though sidelink failures may occur in both directions of the sidelink simultaneously, especially if beamforming is enabled, both user equipment may not detect the sidelink failure at the same time, for example, due to a lack of sidelink data transmissions in one direction. In this case, if sidelink failure detection is preferred to be simultaneous, the user equipment could introduce dummy or "keep-alive" packet transmissions or periodic reference signal transmission for radio measurement purposes.

Certain embodiments described herein may help to recover a failed sidelink with beamforming enabled by allowing computer performance of a function not previously performable by a computer. Certain embodiments are, therefore, directed to improvements in computer-related technology, specifically, providing an adaptive sidelink failure recovery procedure based on failure indication detection and response. In addition, certain embodiments described herein are directed towards conserving network resources and reducing power consumption of network entities and/or user equipment located within the network.

Figure 1:
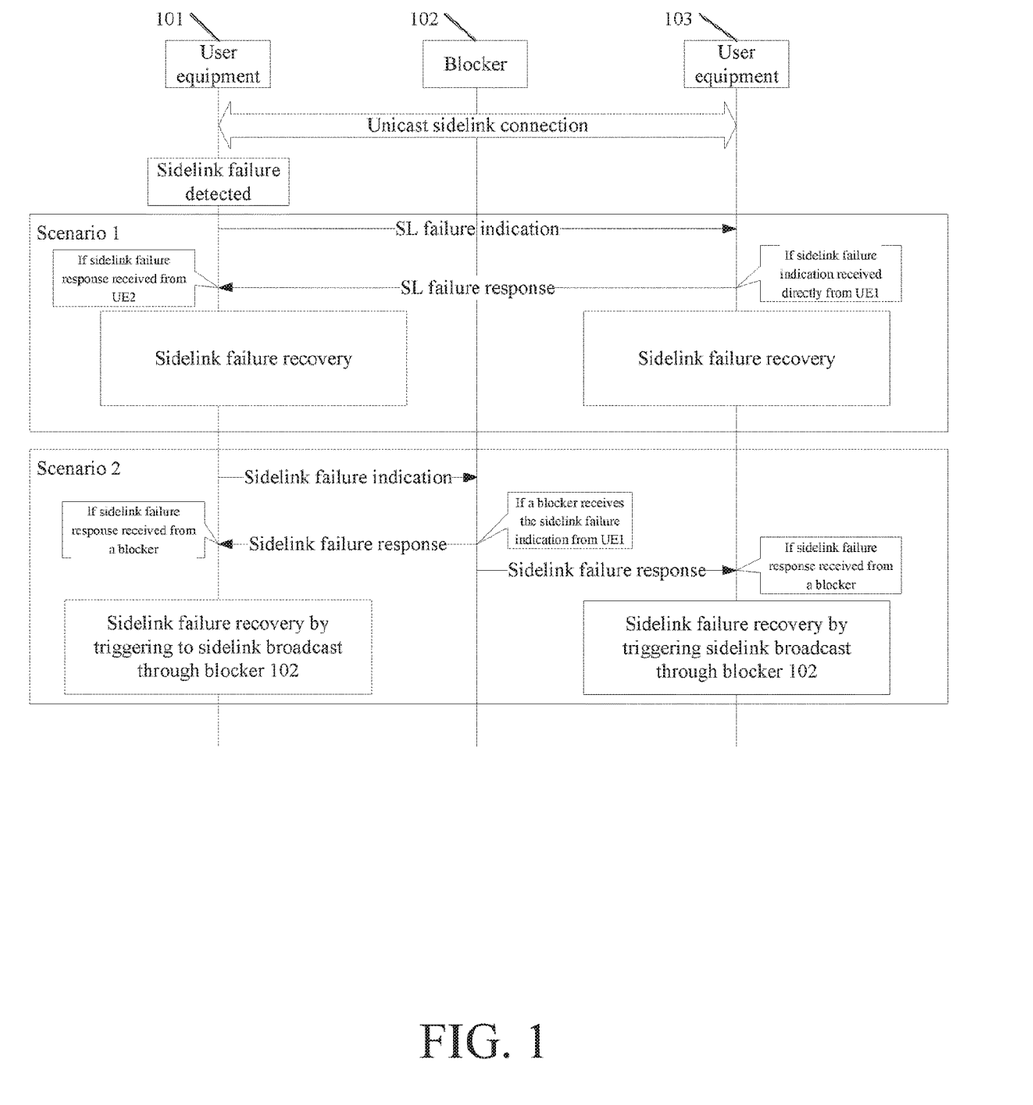
FIG. 1 illustrates an example of a system according to some embodiments.

FIG. 1 illustrates an example of a system according to some embodiments. User equipment 101 and user equipment 103, which may be similar to user equipment 510 in FIG. 5, may have established a unicast sidelink connection. In addition, blocker 102, which may be a network entity similar to network entity 520 in FIG. 5, may cause the established unicast sidelink connection between user equipment 101 and user equipment 103 to be broken.

In some embodiments, a blocker, which may be a signal impediment, such as blocker 102, may be a network entity acting as a physical impediment placed between transmitting and receiving UEs communicating with each other over at least one beamformed sidelink, such as user equipment 101 and user equipment 103. For example, blocker 102 may be similar to UE 510 in FIG. 5, which may be traveling on a vehicle between the UEs, or a roadside unit next to a building at a cross section of roads. Blocker 102 may also be a UE or other access point associated with a physical impediment, such as a wall, building, or other large object temporarily or permanently blocking the SL beam between the UEs.

In some embodiments, upon detecting the sidelink failure, user equipment 101 may transmit at least one sidelink failure indication. The at least one sidelink failure indication may be transmitted using a sidelink failure recovery-specific configuration. As illustrated in scenario 1 of FIG. 1, user equipment 103 may receive and determine that the at least one sidelink failure indication was received from user equipment 101, and transmit at least one sidelink failure response to user equipment 101 using the side link failure recovery-specific configuration. User equipment 101 and user equipment 103 may then initiate recovery of sidelink failure by using at least one configuration, which may or may not be the same as the sidelink failure recovery-specific configuration.

As illustrated in scenario 2 of FIG. 1, the at least one sidelink failure indication may be received using the sidelink failure recovery-specific configuration by blocker 102. Blocker 102 may determine that the at least one sidelink failure indication was received from user equipment 101, and transmit at least one sidelink failure response to user equipment 101 and user equipment 103 using the side link failure recovery-specific configuration. User equipment 101 and user equipment 103 may then initiate recovery of sidelink communication through blocker 102, such as via amplify-and-forward relay and/or decode-and-forward relay.

Figure 2:
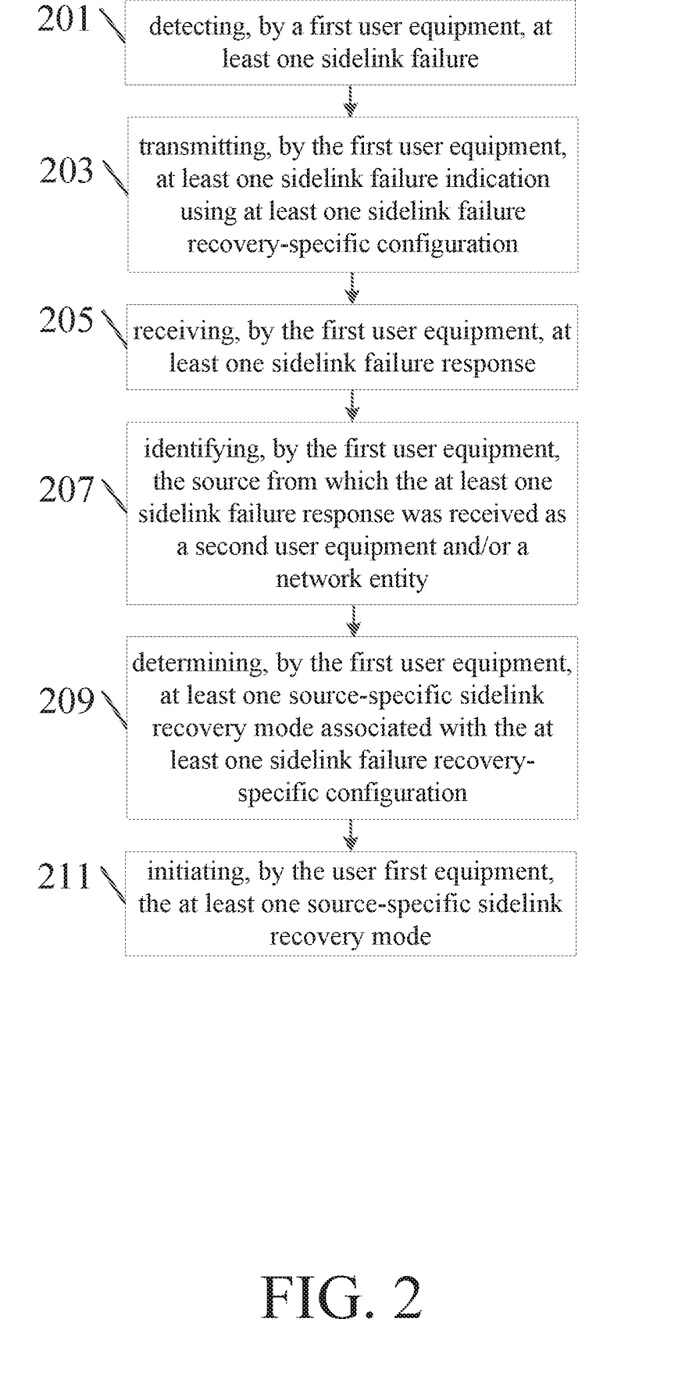
FIG. 2 illustrates an example of a method performed by user equipment according to certain embodiments.

FIG. 2 illustrates an example of a method performed by a first user equipment according to some embodiments. The first user equipment may be similar to user equipment 510 illustrated in FIG. 5. In step 201, the first user equipment may detect at least one sidelink failure. In some embodiments, the detection of the at least one sidelink failure may be based upon one or more of at least one radio measurement, such as reference signal received power (RSRP) and/or reference signal received quality (RSRQ), and/or sidelink data transmission feedback, such as hybrid automatic repeat request (HARQ) acknowledgement (ACK) and/or non-acknowledgement (NACK) or lacking response after sending sidelink data. Additionally or alternatively, the user equipment may transmit at least one sidelink reference signal periodically for maintaining a unicast sidelink with a second user equipment, wherein the same reference signal may be configured for transmission by the first and the second user equipment at different time instances, for example, the time offset between transmissions may be pre-defined or negotiated between the user equipment.

In step 203, upon detecting at least one sidelink failure, the first user equipment may transmit at least one sidelink failure indication using at least one sidelink failure recovery-specific configuration. In some embodiments, the at least one sidelink failure indication may be transmitted as a layer 1 (L1) signal and/or other specific sequence signal. For example, with an L1 signal, at least one L1 signal associated with the sidelink failure indication may be locally and uniquely used by the first user equipment. The serving network may configure the at least one locally unique L1 signal sequence for failure indication when unicast sidelink is established. Alternatively, an L1 signal sequence pool associated with failure indication may be configured. For example, a configured L1 signal sequence pool may contain a list of L1 signal pairs of sidelink failure indications and responses. Thus, the first user equipment may randomly select at least one pair of L1 signals from the sequence pool and/or exchange with a second user equipment the selected at least one pair of L1 signals during establishment or reconfiguration of the unicast sidelink, which may be applied inside and/or outside of network coverage.

In some embodiments, the at least one sidelink failure recovery-specific configuration may be configured during establishment or reconfiguration of the unicast sidelink, which may also be applied inside and/or outside of network coverage. Alternatively or additionally, the at least one sidelink failure recovery-specific configuration may be defined and/or broadcasted in system information when network coverage is available and/or pre-configured with the user equipment in case the user equipment is outside of network coverage, enabling a network entity, such as network entity 520 illustrated in FIG. 5, to detect the sidelink failure indication and/or identify an L1 sequence and/or resource for sidelink failure response. Alternatively or additionally, the at least one sidelink failure recovery-specific configuration may include an L1 signal, as described above. In some embodiments, at least one corresponding resource allocation configuration as sidelink failure recovery-specific configuration for transmitting the at least one sidelink failure indication may be associated with at least one transmitter beam configuration for transmitting the at least one sidelink failure indication.

In certain embodiments, at least one configured beam pattern for transmitting the at least one sidelink failure indication may be configured for the user equipment in time domain. For example, the at least one configured beam pattern for the user equipment may be configured so that the UE may transmit the sidelink failure indication and use the same beam to receive a sidelink failure response from a second user equipment, such as user equipment 510 illustrated in FIG. 5, which may enable the second user equipment to receive the at least one sidelink failure indication and transmit a sidelink failure response when having or not having line-of-sight with the first user equipment.

In some embodiments, at least one wider beam configuration may be associated with the at least one sidelink failure indication in order to allow the first user equipment to transmit the at least one sidelink failure indication in case sidelink failure is caused by a misalignment of narrow beams.

In certain embodiments, the at least one sidelink failure recovery-specific configuration may configure a user equipment to transmit the sidelink failure indication using a different frequency band, such as FR1, where the sidelink communication may also be recovered in the configured frequency band.

Additionally or alternatively, the at least one sidelink failure recovery-specific configuration may be associated with at least one omnidirectional antenna to transmit the at least one sidelink failure indication. For example, the first user equipment may be configured to transmit the at least one sidelink failure indication in another frequency band, such as FR1, using at least one omnidirectional antenna.

Additionally or alternatively, the at least one sidelink failure indication may be a higher-layer message, such as a medium access control (MAC) control-protocol data unit (C-PDU) message, RRC signaling message, and/or non-access stratum (NAS) signaling message. For example, at least one identifier of the sidelink and/or user equipment may be indicated in the at least one sidelink failure indication.

In step 205, the first user equipment may receive at least one sidelink failure response. In some embodiments, the at least one sidelink failure response may be a L1 signal, or other specific sequence signal. For example, with an L1 signal, at least one of L1 signals associated with the sidelink failure response may be locally uniquely used and paired with the L1 signal associated with the corresponding sidelink failure indication. Alternatively, an L1 signal sequence pool associated with failure response may be configured. For example, a configured sequence pool may contain a list of L1 signal of sidelink failure responses, of which each L1 signal of sidelink failure response has one-to-one mapping with the corresponding L1 signal of the sidelink failure indication in the configured sequence pool for sidelink failure indication as described above. Furthermore, an L1 signal indicating sidelink failure response may differ for sidelink failure response from the second user equipment and from a network entity, such as a blocker, for example, by being associated with a different sequence pool and/or being mapped differently from an L1 signal sidelink failure indication.

In some embodiments, the configuration of an L1 signal sequence pool may include at least one mapping between an L1 sequence for failure indication and at least one corresponding failure response from a second user equipment and/or a network entity. The mapping may be defined and/or broadcasted in the system information inside network coverage and/or pre-configured outside of network coverage.

In some embodiments, the at least one sidelink failure response may be associated with the at least one sidelink failure recovery-specific configuration. For example, the same beam of receiving sidelink failure indication may be used to transmit the sidelink failure response if the beam pattern is configured and/or the same frequency band may be used for sidelink failure response. In certain embodiments, another frequency band may be used for sidelink failure responses if another frequency band is indicated in the sidelink failure indication. Additionally or alternatively, the first user equipment may, upon receiving the at least one sidelink failure response, recover the sidelink failure by using the same configuration by which the sidelink failure indication was transmitted and/or sidelink failure response was received.

Figure 5:
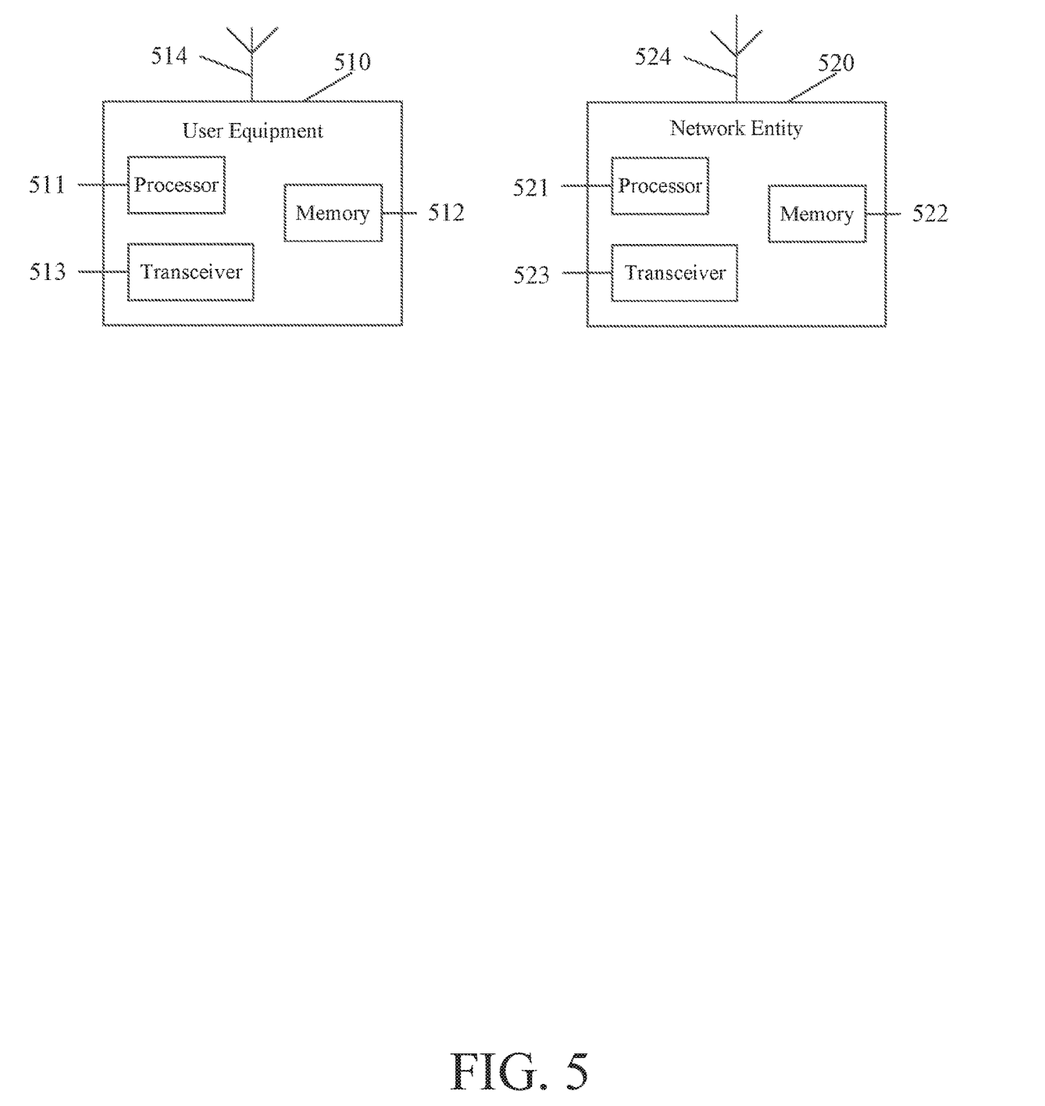
FIG. 5 illustrates an example of another system according to certain embodiments.

In step 207, the first user equipment may identify the source from which the at least one sidelink failure response was received as a second user equipment, which may be similar to user equipment 510 illustrated in FIG. 5, and/or a network entity, such as a blocker, which may be similar to network entity 520 illustrated in FIG. 5. In some embodiments, the identification may be based upon an L1 signal indicating sidelink failure response differing from an L1 signal sidelink failure indication, as described above in step 205.

In step 209, the first user equipment may determine at least one source-specific sidelink recovery mode associated with the at least one sidelink failure recovery-specific configuration.

In step 211, the first user equipment may initiate the at least one source-specific sidelink recovery mode. For example, if the at least one sidelink failure response was identified as being received from a second user equipment, the first user equipment may recover the sidelink failure by using the same configuration by which the at least one sidelink failure indication and at least one sidelink failure response is transmitted and received, such as the same beam or the same frequency band.

In some embodiments, if the at least one sidelink failure response is identified as being received from a network entity, the first user equipment and a second user equipment may recover the sidelink failure by switching to a sidelink broadcast mode to allow the network entity to relay the sidelink communication.

In certain embodiments, if the at least one sidelink failure response is received from both a second user equipment and a network entity, the first user equipment may decide to recover the sidelink failure by using the same configuration by which the at least one sidelink failure indication and at least one sidelink failure response is transmitted and received from the second user equipment and/or by changing to at least one broadcast mode transmission so that either the second user equipment can receive the transmission directly from the first user equipment and/or via relay by the network entity.

In some embodiments, if the first user equipment does not receive any sidelink failure response within a pre-defined time period, the first user equipment may request from the serving network for mode switching from sidelink to a Uu radio interface between the first user equipment and the radio access network to recover the sidelink failure and/or continue the communication via Uu interface of the serving network.

Figure 3:
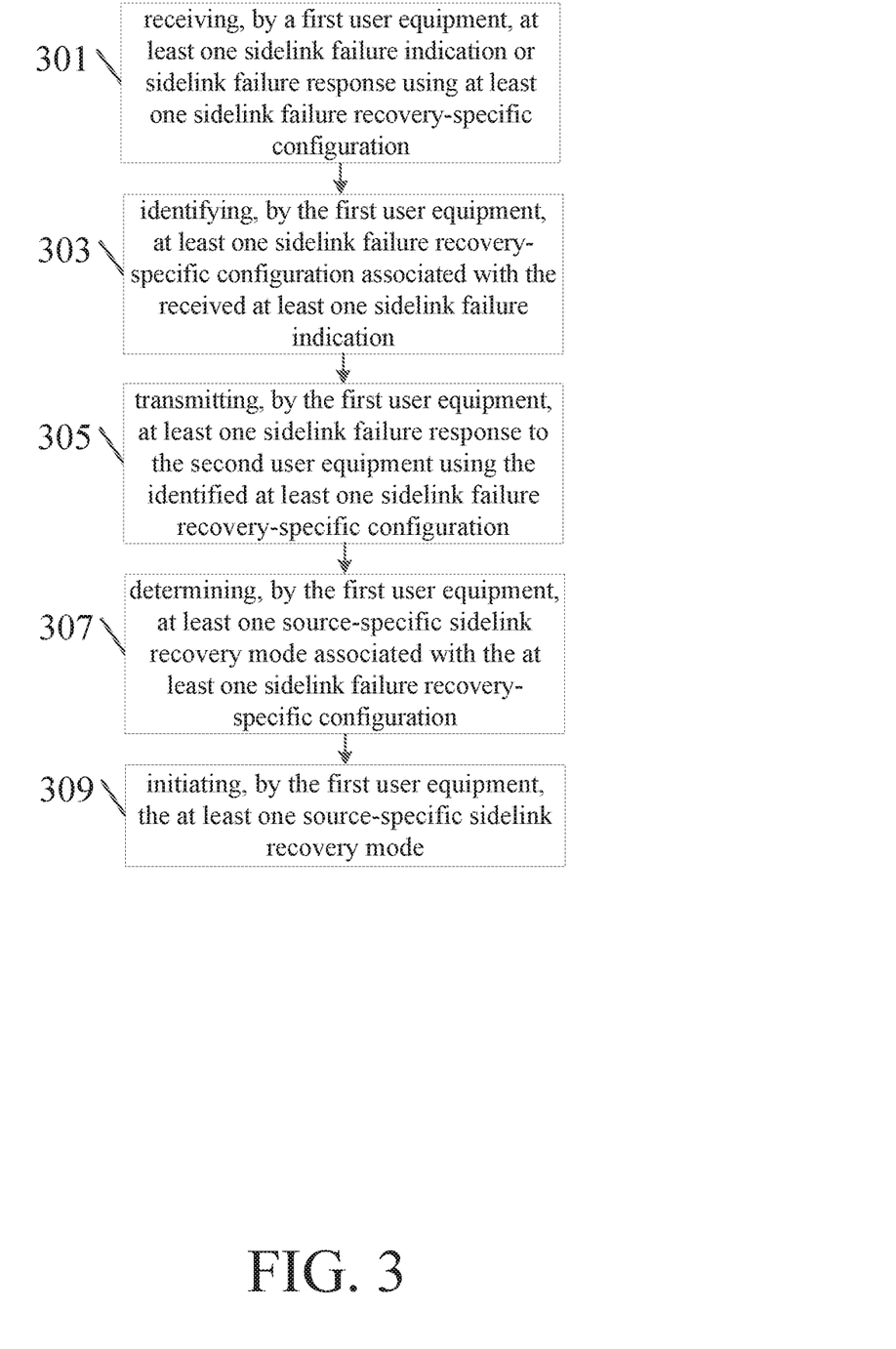
FIG. 3 illustrates another example of a method performed by user equipment according to some embodiments.

FIG. 3 illustrates an example of a method performed by a first user equipment according to some embodiments. For example, the first user equipment may be similar to user equipment 510 illustrated in FIG. 5.

In step 301, a first user equipment may receive at least one sidelink failure indication or sidelink failure response using at least one sidelink failure recovery-specific configuration. For example, the at least one sidelink failure indication may be received from a second user equipment. In some embodiments, the at least one sidelink failure indication may be a L1 signal, or other specific sequence signal. For example, with an L1 signal, at least one of L1 signals associated with the sidelink failure indication may be locally unique. The serving network may configure the at least one locally unique pair of L1 signal sequence for failure indication and response when unicast sidelink is established. Alternatively, an L1 signal sequence pool associated with failure indication may be configured. For example, a configured sequence pool may contain a list of L1 signal pairs of sidelink failure indications and responses. Thus, the first user equipment may randomly select at least one pair of L1 signals from the sequence pool and/or exchange the selected at least one pair of L1 signals during establishment or reconfiguration of the unicast sidelink, which may be applied inside and/or outside network coverage.

In some embodiments, at least one corresponding resource allocation for receiving the at least one sidelink failure indication or response may be associated with receiver beam configuration for receiving the at least one sidelink failure indication.

In certain embodiments, at least one configured beam pattern for receiving the sidelink failure indication or response may be configured for the first user equipment in time domain. For example, the at least one configured beam pattern for the first user equipment may be configured so that the first user equipment may receive the sidelink failure indication using the same beam to transmit a sidelink failure response to a second user equipment, such as user equipment 510 illustrated in FIG. 5, which may enable the at least one sidelink failure indication to be received by the first user equipment that has line-of-sight with the second user equipment.

In some embodiments, at least one wider beam configuration may be associated with the at least one sidelink failure indication in order to allow the first user equipment to receive the at least one sidelink failure indication in case the sidelink failure is caused by misalignment of narrow beams.

In certain embodiments, the at least one sidelink failure recovery-specific configuration may receive the sidelink failure indication using a different frequency band, such as FR1, where the sidelink communication may also be recovered in the configured frequency band.

Additionally or alternatively, the at least one sidelink failure recovery-specific configuration may be associated with an omnidirectional antenna to receive the at least one sidelink failure indication. For example, the first user equipment may be configured to receive the sidelink failure indication in another frequency band, such as FR1, using an omnidirectional antenna.

Additionally or alternatively, the at least one sidelink failure indication may be a higher-layer message, such as a MAC C-PDU message, RRC signaling message, and/or NAS signaling message.

In step 303, the first user equipment may identify the source from which the at least one sidelink failure indication was received as a second user equipment, which may be similar to user equipment 510 illustrated in FIG. 5, and/or from which the at least one sidelink failure response was received as a network entity, such as a blocker, which may be similar to network entity 520 illustrated in FIG. 5. Alternatively or additionally, in some embodiments, in step 303, the first user equipment may also identify at least one sidelink failure recovery-specific configuration associated with the received at least one sidelink failure indication.

In step 305, the first user equipment may transmit at least one sidelink failure response to the second user equipment using the identified at least one sidelink failure recovery-specific configuration, for example, if it identifies the source from which the at least one sidelink failure indication was received as the second user equipment. In some embodiments, the at least one sidelink failure response may be a L1 signal, or other specific sequence signal. For example, with an L1 signal, at least one of L1 signals associated with the sidelink failure response may be locally uniquely used and paired with the L1 signal associated with the corresponding sidelink failure indication. Alternatively, an L1 signal sequence pool associated with failure response may be configured. For example, a configured sequence pool may contain a list of L1 signal of sidelink failure responses, of which each L1 signal of sidelink failure response has one-to-one mapping with the corresponding L1 signal of the sidelink failure indication in the configured sequence pool for sidelink failure indication as described above. Furthermore, an L1 signal indicating sidelink failure response may differ from an L1 signal sidelink failure indication, for example, by being associated with a different sequence pool and/or being mapped differently from an L1 signal sidelink failure indication.

In some embodiments, the configuration of an L1 signal sequence pool may include a mapping between an L1 sequence for failure indication and a corresponding failure response from the first user equipment and/or a network entity. The mapping may be defined and/or broadcasted in the system information in network coverage and/or pre-configured outside of network coverage.

Additionally or alternatively, the at least one sidelink failure response may be a higher-layer message, such as a MAC C-PDU message, RRC signaling message, and/or NAS signaling message. For example, at least one identifier of the sidelink and/or first user equipment may be indicated in the sidelink failure indication.

In step 307, the first user equipment may determine at least one source-specific sidelink recovery mode associated with the at least one sidelink failure recovery-specific configuration. In some embodiments, the at least one sidelink failure response may be associated with the at least one sidelink failure recovery-specific configuration. For example, the same beam may be used if the beam pattern is configured and/or the same frequency band or another frequency band if another frequency band is configured.

Figure 4:
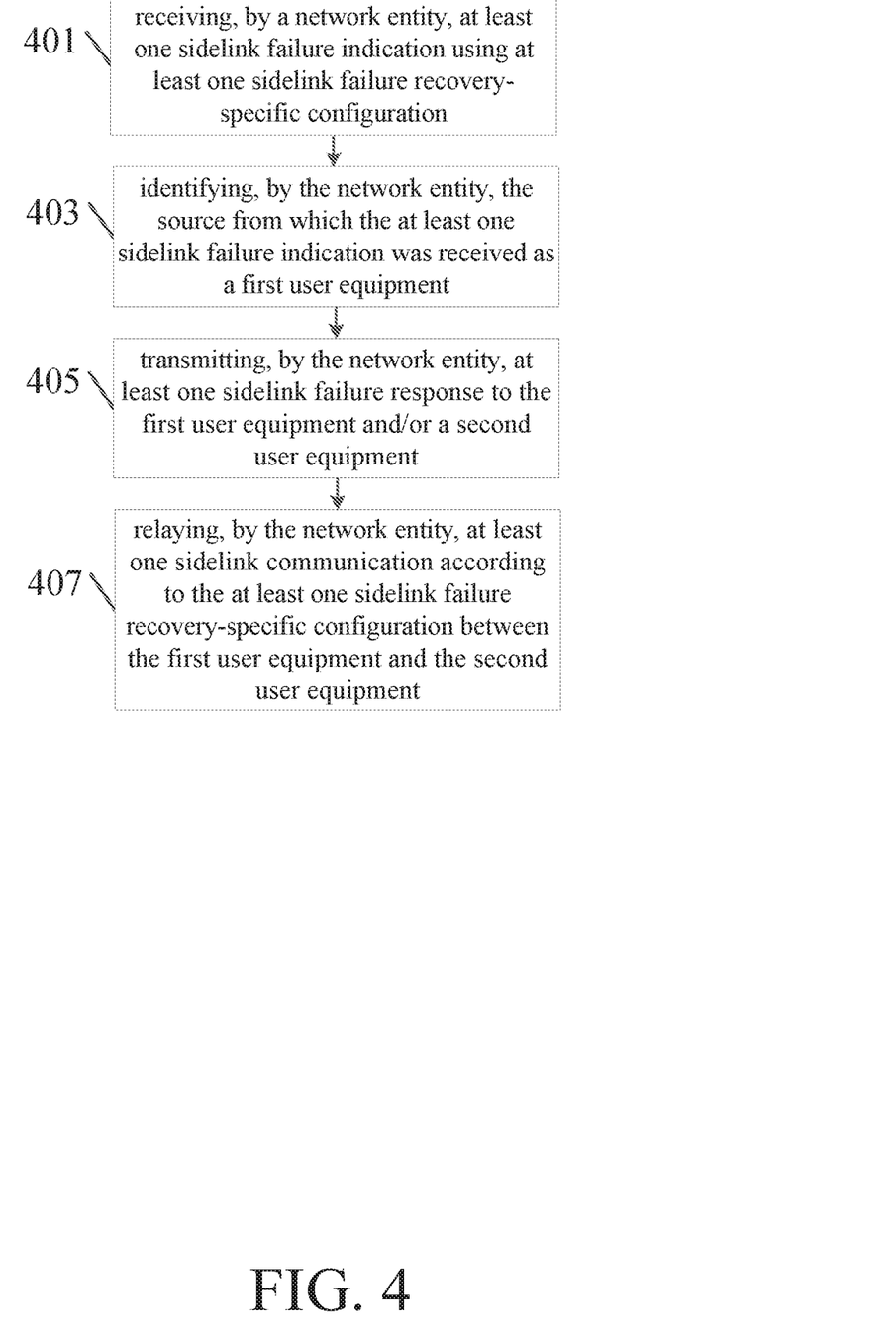
FIG. 4 illustrates an example of a method performed by a network entity according to some embodiments.

In step 309, the first user equipment may initiate the at least one source-specific sidelink recovery mode. Additionally or alternatively, the first user equipment may recover the sidelink failure by using the same configuration that the sidelink failure indication was received for sidelink communication if the sidelink failure indication was received from the second user equipment. Additionally or alternatively, the first user equipment may recover the sidelink failure through the network entity, such as a blocker, FIG. 4 illustrates an example of a method performed by a network entity according to some embodiments. For example, the network entity may be similar to network entity 520 illustrated in FIG. 5.

In step 401, the network entity may receive at least one sidelink failure indication using at least one sidelink failure recovery-specific configuration.

In some embodiments, the at least one sidelink failure indication may be a L1 signal, or other specific sequence signal. For example, with an L1 signal, at least one L1 signal associated with the sidelink failure indication may be locally unique. The serving network may configure the at least one locally unique L1 signal sequence for failure indication when unicast sidelink is established. Alternatively, an L1 signal sequence pool associated with failure indication may be configured. For example, a configured sequence pool may contain a list of L1 signal of sidelink failure indications. Thus, a first user equipment may randomly select at least one of L1 signals from the sequence pool and exchange the selected at least one L1 signal with a second user equipment during, for example, establishment or reconfiguration of the unicast sidelink between the first user equipment and the second user equipment, which may be applied inside and/or outside network coverage. The selected at least one L1 signal may be used by either the first user equipment or the second user equipment for indicating at least one failure of the established unicast sidelink between the first user equipment and the second user equipment when a failure of the established unicast sidelink is detected by either one of the user equipment.

In some embodiments, at least one corresponding resource allocation for receiving the at least one sidelink failure indication may be associated with receiver beam configuration for receiving the at least one sidelink failure indication.

Additionally or alternatively, the at least one sidelink failure indication may be a higher-layer message, such as a MAC C-PDU message, RRC signaling message, and/or NAS signaling message. In this case, one sidelink failure indication may be transmitted as a broadcast instead of a unicast so that the network entity may receive the sidelink failure indication.

In certain embodiments, the network entity may receive periodic sidelink reference signals for maintaining a unicast sidelink between user equipment. For example, at least one reference signal may be configured to the first and second user equipment of a sidelink unicast connection for transmission at different time instances. If the network entity receives at least one reference signal from both a first user equipment and a second user equipment according to a pre-defined time offset, the network entity may consider it as an implicit sidelink failure indication, indicating that the network entity is hindering sidelink communication between the first user equipment and the second user equipment.

In step 403, the network entity may identify the source from which the at least one sidelink failure indication was received as a first user equipment, which may be similar to user equipment 510 illustrated in FIG. 5.

In some embodiments, a sidelink identifier and/or user equipment identifier may be either derived from a sidelink failure indication L1 sequence signal and/or indicated in a sidelink failure indication if higher layer messaging is used for sidelink failure indication.

In step 405, the network entity may transmit, such as by broadcasting, at least one sidelink failure response to the first user equipment and/or a second user equipment, which may be similar to user equipment 510 illustrated in FIG. 5.

In some embodiments, the determination of transmitting at least one sidelink failure response may be based on one or more of whether the network entity has at least one relay capability, whether the network entity receives a pre-determined number of sidelink failure indications from different sidelink connections, whether the network entity receives the sidelink failure indication from multiple user equipment of the same sidelink unicast connection, and/or whether the network entity detects the sidelink failure response from a user equipment corresponding with the received sidelink failure indication etc. Additionally or alternatively, where the network entity receives a pre-determined number of sidelink failure indications from different sidelink connections, the network entity may only send sidelink failure responses to specific sidelink user equipment.

In certain embodiments, where the network entity receives at least one sidelink reference signal as described above, the network entity may send at least one sidelink failure response as either a L1 signal corresponding to the at least one received sidelink reference signal and/or the higher layer message indicating the received sidelink reference signal to the first user equipment and/or second user equipment.

In step 407, the network entity may relay at least one sidelink communication according to the at least one sidelink failure recovery-specific and/or different configuration between the first user equipment and the second user equipment.

FIG. 5 illustrates an example of a system according to certain embodiments. In one embodiment, a system may include multiple devices, such as, for example, user equipment 510 and/or network entity 520.

User equipment 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 520 may be one or more of a base station, such as an evolved node B (eNB) or 5G or New Radio node B (gNB), a serving gateway, a server, and/or any other access node or combination thereof. Network entity 520 may also be similar to user equipment 510. Furthermore, user equipment 510 and/or network entity 520 may be one or more of a citizens broadband radio service device (CBSD).

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
4G 4th Generation Mobile Network
5G 5th Generation Mobile Network
ACK Acknowledgement
FR Frequency Range
gNB New Radio Base Station HARQ Hybrid Automatic Repeat Request
LoS Line of Sight
LTE Long-Term Evolution
MAC Medium Access Control
NACK Non-Acknowledgement
NAS Non-Access Stratum
NE Network Entity
NLOS Non Line of Sight
NR New Radio
PDU Protocol Data Unit
RRC Radio Resource Control
RSRP Reference Signal Received Power
RSRQ Reference Signal Received Quality
Rx Receiver
SB Subband
SL Sidelink
Tx Transmitter
UE User Equipment

We claim:

1. An apparatus, comprising:
at least one processor; and
at least one memory including computer program code,
wherein the at least one memory and the computer program code are configured to, with the at least one processor, cause the apparatus to:
when the apparatus is comprised in a first user equipment:
detect at least one sidelink failure indication, wherein the detection of the at least one sidelink failure is based upon at least one radio measurement comprising a reference signal received power (RSRP), a reference signal received quality (RSRQ), sidelink data transmission feedback comprising a hybrid automatic repeat request (HARQ) acknowledgement (ACK), and a non-acknowledgement (NACK) or lacking response after sending sidelink data;
transmit at least one sidelink reference signal periodically for maintaining a unicast sidelink with a second user equipment, wherein the same reference signal is configured for transmission by the first and the second user equipment at different time instances, wherein a time offset between transmissions is predefined or negotiated between the user equipment;
transmit at least one sidelink failure indication using at least one sidelink failure recovery-specific configuration;
receive at least one sidelink failure response;
determine at least one source-specific sidelink recovery mode associated with the at least one sidelink failure recovery-specific configuration; and
determine whether the source from which at least one sidelink failure response was received is another apparatus comprised in the second user equipment or a network entity; and
when the apparatus is comprised in the second user equipment:
receive at least one sidelink failure indication;
identify at least one sidelink failure recovery-specific configuration associated with the received at least one sidelink failure indication;
transmit at least one sidelink failure response using the identified at least one sidelink failure recovery-specific configuration;
determine at least one source-specific sidelink recovery mode associated with the at least one sidelink failure recovery-specific configuration; and
determine whether at least one of the destination to which the at least one sidelink failure response was sent or the source from which the at least one sidelink failure indication was received is another apparatus comprised in the first user equipment or a network entity,
wherein the at least one memory and the computer program code are configured to, with the at least one processor, cause the apparatus to: initiate the at least one source-specific sidelink recovery mode,
wherein the at least one sidelink failure recovery-specific configuration includes at least one L1 signal associated with the sidelink failure indication locally and uniquely used by the first user equipment, wherein an L1 signal sequence pool is associated with failure indication, wherein the first user equipment randomly selects at least one pair of L1 signals from the sequence pool and/or exchange with a second user equipment the selected at least one pair of L1 signals during establishment or reconfiguration of the unicast sidelink, which is applied inside and/or outside of network coverage,
wherein at least one wider beam configuration is associated with the at least one sidelink failure indication configured to allow the apparatus to transmit the at least one sidelink failure indication, or allow the apparatus to receive the at least one sidelink failure indication and transmit the at least one sidelink failure response, in case sidelink failure is caused by a misalignment of narrow beams,
wherein the at least one sidelink failure recovery-specific configuration is associated with at least one omnidirectional antenna configured to at least one of transmit the at least one sidelink failure indication, receive the at least one sidelink failure indication or transmit the at least one sidelink failure response,
wherein the at least one sidelink failure recovery-specific configuration comprises configuration of a signal sequence pool comprising at least one mapping between a sequence configured for failure indication and at least one corresponding failure response,
wherein the at least one memory and the computer program code are configured to, with the at least one processor, cause the apparatus to:
when comprised in the first user equipment, upon identifying the at least one sidelink failure response as being received from another apparatus comprised in the second user equipment, or when comprised in the second user equipment, upon identifying at least one of the at least one sidelink failure response as being transmitted to another apparatus comprised in the first user equipment or the at least one sidelink failure indication as being received from another apparatus comprised in the first user equipment, recover, by the apparatus, the sidelink failure by using the same configuration by which the at least one sidelink failure indication and at least one sidelink failure response is communicated; and
when comprised in the first user equipment, upon identifying the at least one sidelink failure response as being received from a network entity, or when comprised in the second user equipment, upon identifying the at least one of the at least one sidelink failure response as being transmitting to a network entity or the at least one sidelink failure indication as being received from the network entity, recover, by the apparatus, the sidelink failure by switching to a sidelink broadcast mode to allow the network entity to relay the sidelink communication,
wherein if the first user equipment does not receive any sidelink failure response within a pre-defined time period, the at least one memory and the computer program code are configured to, with the at least one processor, cause the apparatus to request from the serving network for mode switching from sidelink to a Uu radio interface between the first user equipment and the radio access network to recover the sidelink failure and continue the communication via Uu interface of the serving network.

2. The apparatus according to claim 1, wherein at least one corresponding resource allocation configuration is configured as a sidelink failure recovery-specific configuration for transmitting the at least one sidelink failure indication or the at least one sidelink failure response is associated with at least one transmitter beam configuration for transmitting the at least one sidelink failure indication or the at least one sidelink failure response, respectively.

3. The apparatus according to claim 2, wherein at least one configured beam pattern for at least one of transmitting the at least one sidelink failure indication, receiving the at least one sidelink failure indication or transmitting the at least one sidelink failure response, is configured for the apparatus in time domain.

4. The apparatus according to claim 3, wherein the at least one sidelink failure recovery-specific configuration is configured to configure the apparatus to transmit the sidelink failure indication, or to at least one of receive the at least one sidelink failure indication or transmit the at least one sidelink failure response, using a different frequency band.

5. The apparatus according to claim 4 wherein the at least one sidelink failure recovery-specific configuration comprises configuration of a signal sequence pool comprising at least one mapping between a sequence configured for failure indication and at least one corresponding failure response.

6. The apparatus according to claim 5, wherein if the at least one sidelink failure response is received from both a second user equipment and a network entity, the first user equipment is caused to recover the sidelink failure by using the same configuration by which the at least one sidelink failure indication and the at least one sidelink failure response is transmitted and received from the second user equipment and by changing to at least one broadcast mode transmission so that either the second user equipment can receive the transmission directly from the first user equipment and via relay by the network entity.

7. A method, comprising:
when the apparatus is comprised in a first user equipment:
detecting at least one sidelink failure indication, wherein the detection of the at least one sidelink failure is based upon at least one radio measurement comprising a reference signal received power (RSRP), a reference signal received quality (RSRQ), sidelink data transmission feedback comprising a hybrid automatic repeat request (HARQ) acknowledgement (ACK), and a non-acknowledgement (NACK) or lacking response after sending sidelink data;
transmitting at least one sidelink reference signal periodically for maintaining a unicast sidelink with a second user equipment, wherein the same reference signal is configured for transmission by the first and the second user equipment at different time instances, wherein a time offset between transmissions is pre-defined or negotiated between the user equipment;
transmitting at least one sidelink failure indication using at least one sidelink failure recovery-specific configuration;
receiving at least one sidelink failure response;
determining at least one source-specific sidelink recovery mode associated with the at least one sidelink failure recovery-specific configuration And
determining whether the source from which at least one sidelink failure response was received is another apparatus comprised in a second user equipment or a network entity; and
when the apparatus is comprised in the second user equipment:
receiving at least one sidelink failure indication;
identifying at least one sidelink failure recovery-specific configuration associated with the received at least one sidelink failure indication;
transmitting at least one sidelink failure response using the identified at least one sidelink failure recovery-specific configuration;
determining at least one source-specific sidelink recovery mode associated with the at least one sidelink failure recovery-specific configuration; and
determining whether at least one of the destination to which the at least one sidelink failure response was sent or the source from which the at least one sidelink failure indication was received is another apparatus comprised in the first user equipment or a network entity,
wherein the method further comprises: initiating the at least one source -specific sidelink recovery mode,
wherein if the first user equipment does not receive any sidelink failure response within a pre-defined time period, the first user equipment requests from the serving network mode switching from sidelink to a Uu radio interface between the first user equipment and the radio access network to recover the sidelink failure and continue the communication via Uu interface of the serving network,
wherein the at least one sidelink failure recovery-specific configuration includes at least one L1 signal associated with the sidelink failure indication locally and uniquely used by the first user equipment, wherein an L1 signal sequence pool is associated with failure indication, wherein the first user equipment randomly selects at least one pair of L1 signals from the sequence pool and/or exchange with a second user equipment the selected at least one pair of L1 signals during establishment or reconfiguration of the unicast sidelink, which is applied inside and/or outside of network coverage.

8. An apparatus, comprising:
at least one processor; and
at least one memory including computer program code, wherein the at least one memory and the computer program code are configured to, with the at least one processor, cause the apparatus to:
receive, by a network entity, at least one sidelink failure indication using at least one sidelink failure recovery-specific configuration, wherein the at least one sidelink failure indication comprises at least one L1 signal associated with the sidelink failure indication that is locally unique, and wherein an L1 signal sequence pool associated with failure indication is configured, the configured sequence pool including a list of L1 signal of sidelink failure indications;

receive periodic sidelink reference signals for maintaining a unicast sidelink between user equipment, wherein at least one reference signal is configured to the first and second user equipment of a sidelink unicast connection for transmission at different time instances, wherein if the network entity receives at least one reference signal from both a first user equipment and a second user equipment according to a pre-defined time offset, the network entity considers it as an implicit sidelink failure indication, indicating that the network entity is hindering sidelink communication between the first user equipment and the second user equipment;

identify, by the network entity, the source from which the at least one sidelink failure indication was received as a first user equipment;

transmit, by the network entity, at least one sidelink failure response to the first user equipment and/or a second user equipment via signaling dependent on whether the at least one sidelink failure response is transmitted to the first user equipment or the second user equipment; and relay, by the network entity, at least one sidelink communication between the first user equipment and the second user equipment, wherein the determination of transmitting at least one sidelink failure response is based on whether the network entity:

has at least one relay capability;

receives a pre-determined number of sidelink failure indications from different sidelink connections;

receives the sidelink failure indication from multiple user equipment of the same sidelink unicast connection; and detects the sidelink failure response from a user equipment corresponding with the received sidelink failure indication, wherein where the network entity receives a pre-determined number of sidelink failure indications from different sidelink connections, the network entity may only send sidelink failure responses to specific sidelink user equipment, wherein at least one corresponding resource allocation configuration configured as a sidelink failure recovery-specific configuration for at least one of receiving the at least one sidelink failure indication and transmitting the at least one sidelink failure response is associated with at least one transmitter beam configuration for transmitting the at least one sidelink failure indication, wherein at least one configured beam pattern for at least one of receiving the at least one sidelink failure indication and transmitting the at least one sidelink failure response is configured for the network entity in time domain.

* * * * *